US008792112B2

(12) United States Patent
Uematsu

(10) Patent No.: US 8,792,112 B2
(45) Date of Patent: Jul. 29, 2014

(54) PRINTING APPARATUS AND ERROR PROCESSING METHOD THEREOF

(75) Inventor: Takanori Uematsu, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 129 days.

(21) Appl. No.: 13/432,874

(22) Filed: Mar. 28, 2012

(65) Prior Publication Data

US 2012/0250069 A1 Oct. 4, 2012

(30) Foreign Application Priority Data

Apr. 1, 2011 (JP) ................................ 2011-081688

(51) Int. Cl.
*G06K 15/00* (2006.01)
*G06F 3/12* (2006.01)

(52) U.S. Cl.
USPC ............ 358/1.14; 358/1.13; 358/1.1; 358/1.9

(58) Field of Classification Search
None
See application file for complete search history.

(56) References Cited

U.S. PATENT DOCUMENTS 8,210,636 B2 * 7/2012 Uematsu ........................ 347/16
8,405,843 B2 * 3/2013 Oi et al. ...................... 358/1.14
2008/0266336 A1 * 10/2008 Maru et al. ........................ 347/7
2010/0033752 A1 2/2010 Oi et al.
2010/0061743 A1 * 3/2010 Uematsu ........................ 399/38
2010/0073700 A1 * 3/2010 Uematsu ...................... 358/1.13
2013/0120491 A1 * 5/2013 Maru et al. ...................... 347/19

FOREIGN PATENT DOCUMENTS

JP 2010-036440 A 2/2010

* cited by examiner

*Primary Examiner* — Satwant Singh
(74) *Attorney, Agent, or Firm* — Kilpatrick Townsend & Stockton LLP

(57) ABSTRACT

When a simple error for which power off is unnecessary for the error resolution is generated, a movement process is executed without waiting to receive the button operation of the user, when conditions including a paper jam possibility condition are satisfied in a case where a motor error in which the CR motor is generated, a movement process is executed after waiting to receive the button operation of the user, and when the conditions including the paper jam possibility condition are not satisfied even when a motor error is generated, an error display process for a fatal error is performed. In this manner, when the process for a simple error with respect to the generated motor error is executed, the user may perform, for example, removal of the paper that is the cause of the paper jam or the like before the movement process is executed by the button operation.

4 Claims, 5 Drawing Sheets

FIG. 5

| | | DURING FEEDING | DURING PRINTING | DURING DISCHARGING |
|---|---|---|---|---|
| START BUTTON OPERATION | PAPER DETECTION ON | FEED PRINTING REQUIREMENT OF CURRENT PAGE AFTER DISCHARGING | FEED PRINTING REQUIREMENT OF NEXT PAGE AFTER DISCHARGING | FEED PRINTING REQUIREMENT OF NEXT PAGE AFTER DISCHARGING |
| | PAPER DETECTION OFF | FEED PRINTING REQUIREMENT OF CURRENT PAGE | — | — |
| CANCEL BUTTON OPERATION | | DISCHARGING REQUEST | | |

PRINTING APPARATUS AND ERROR PROCESSING METHOD THEREOF

This application claims priority to Japanese Patent Application No. 2011-081688, filed Apr. 1, 2011, the entirety of which is incorporated by reference herein.

BACKGROUND

1. Technical Field

The present invention relates to a printing apparatus and an error processing method thereof, in particular, to a printing apparatus which is capable of processing a fatal error for which powering off is necessary for error resolution and a simple error for which powering off is not necessary for error resolution, and an error processing method thereof.

2. Related Art

Hitherto, for this kind of printing apparatus, it has been proposed that when a first error, such as a cover open error or a no paper error, or a second error, such as a paper jam error or a mechanical error, is generated during printing to a printing region such as a label of a sheet of recording paper, the error resolution operation is awaited and reprinting is performed on the printing region, and that when the first error or the second error is generated during feeding of the blank region of the recording paper, reprinting is not performed with respect to the first error, and the error resolution operation is awaited and reprinting is performed with respect to the second error (for example, refer to JP-A-2010-36440). In such an apparatus, when the first error is generated by such a process during feeding of the blank region of the recording paper, that is, when an error in which there is no damage to the printing region of the recording paper or the printed image itself is generated, setting is performed so that reprinting is not carried out.

Here, in printing apparatuses, there is a demand for more appropriate handling with respect to errors such as fatal errors serious enough that powering off is necessary for the error resolution or with respect to simple errors for which powering off is unnecessary for the error resolution. For example, when a fatal error is generated during printing and a reset process using a system reboot in order to enable a reliable return to a normal state is determined to be necessary, if powering off is unavoidable regardless of whether the user may specify to a certain extent the cause of the fatal error from the printing conditions or the like, the user may be required to re-enter printing instructions or required to wait for a reboot, and thereby feel inconvenienced.

SUMMARY

An advantage of some aspects of the invention is that there is provided a printing apparatus and error processing method thereof enabling the more appropriate handling of errors.

According to an aspect of the invention, there is provided a printing apparatus capable of processing a fatal error for which powering off is necessary for error resolution and a simple error for which powering off is not necessary for error resolution, including: a driving motor used in a printing process; an operation receiving unit that receives an instruction operation of a user; and an error process execution unit that executes a process for predetermined errors, in which, when the simple error is generated, the error process execution unit executes a process for a simple error determined in advance without waiting to receive the instruction operation of the user using the operation receiving unit, when a motor error in which the driving motor no longer runs normally is generated during the execution of the printing process and predetermined process conditions setting the process for the simple error to be executable are satisfied with respect to the motor error, the error process execution unit executes the process for the simple error after waiting to receive the instruction operation of the user using the operation receiving unit, and when the motor error is generated and the predetermined process conditions are not satisfied, the error process execution unit executes a process for a fatal error determined in advance.

It is preferable that, when a simple error for which powering off is unnecessary is generated in the error resolution, a process for a simple error determined in advance is performed without waiting to receive the instruction operation of a user using the operation receiving unit. In addition, when a motor error in which the driving motor no longer runs normally is generated during the execution of the printing process and predetermined process conditions setting the process for the simple error to be executable are satisfied with respect to the motor error, the process for the simple error is executed after waiting to receive the instruction operation of the user using the operation receiving unit. Next, when the motor error is generated and the predetermined process conditions are not satisfied, a process for a fatal error determined in advance is executed. In this manner, it is possible to execute a process for a simple error or a process for a fatal error with respect to a generated motor error. In addition, when the process for a simple error with respect to the generated motor error is executed, the user may perform, for example, confirmation of the apparatus state, a necessary operation, or the like before the process for a simple error is executed using the instruction operation. Further, when the simple error process with respect to the generated motor error is executed, it is possible to execute the process for a simple error in the same manner as the case where a simple error is generated by simply waiting to receive the instruction operation of the user. Accordingly, it is possible to execute a common process with the case where a simple error is generated while performing more appropriate handling with respect to a motor error, whereby it becomes possible to perform more appropriate handling with respect to errors. Here, the process for a fatal error is a process determined in advance to be executed with respect to a fatal error and includes a process or the like for providing notification of the generation of the fatal error.

It is preferable that the driving motor be mounted with an ejecting head ejecting ink, move inside the region of the paper and move a carriage that moves to a home position which may cap the ejection head outside the region of the paper and that the error process execution unit execute a process of moving the carriage to the home position using the driving motor as the process for a simple error without waiting to receive the instruction operation of the user using the operation receiving unit when a simple error is generated. Further, when predetermined processing conditions are satisfied including the condition that it is possible to determine if there is a possibility that paper clogging, in which the paper becomes clogged during paper supply or during printing according to the printing process when the motor error is generated, is generated, the error process execution unit stops the movement of the carriage by the driving motor, waits to receive the instruction operation of the user using the operation receiving unit, and executes the process for a simple error. In this manner, when it is determined that there is a possibility that paper clogging is generated and the process for a simple error is executed with respect to the motor error, it is possible to wait to receive the instruction operation of the user in the state where the carriage is stopped, and, for example, the user may deal with the cause of the paper clogging by removing paper or the like.

Accordingly, when it is determined that there is a possibility that paper clogging has been generated and a process for a simple error is executed with respect to the motor error, it is possible to perform handling more appropriately with respect to the motor error. Naturally, when a simple error is generated, it is possible to move the carriage to the home position without waiting to receive the instruction operation of the user whereby it is possible to execute the next operation of the printing apparatus such as paper supply or reprinting more easily, for example.

It is preferable that, when the carriage is moved by the driving motor, it be possible to set a unit that executes a process of moving the carriage to the home position using the driving motor and capping the ejection head as the process for a simple error. In this manner, it is possible to protect the ejection head from drying or the like.

It is preferable that the error process execution unit be set as follows. When a simple error is generated, the error process execution unit receives an instruction operation of a user using the operation receiving unit after executing the process for a simple error, and the printing apparatus sets the target operation to be executed next based on the received instruction operation of the user and on the operation state of the printing apparatus including whether the printing apparatus at the time the simple error is generated is printing, feeding paper, or discharging paper. Further, when the motor error is generated and the predetermined processing conditions are satisfied, the error process execution unit receives the instruction operation of the user using the operation receiving unit before executing the process for a simple error and sets the target operation of the printing apparatus based on the received instruction operation of the user and on the operation state of the printing apparatus at the time the motor error is generated. In this manner, even in cases where a simple error is generated or a process for a simple error is executed with respect to a motor error, it is possible to determine the next operation of the printing apparatus more appropriately. Accordingly, when the process for a simple error is executed with respect to the motor error, it is possible to execute the process for a simple error and to set the target operation of the printing apparatus in the same manner as the case where a simple error is generated by simply waiting to receive the instruction operation of the user, that is, it is possible to execute a common process with a case where a simple error is generated.

According to another aspect of the invention, there is provided an error processing method of a printing apparatus provided with a driving motor used in a printing process and an operation receiving unit that receives an instruction operation of a user and capable of processing a fatal error for which powering off is necessary for error resolution and a simple error for which powering off is not necessary for error resolution, the error processing method including: executing a process for a simple error determined in advance without waiting to receive the instruction operation of the user using the operation receiving unit when the simple error is generated; executing the process for the simple error after waiting to receive the instruction operation of the user using the operation receiving unit when a motor error in which the driving motor no longer runs normally is generated during the execution of the printing process and predetermined process conditions setting the process for the simple error to be executable are satisfied with respect to the motor error; and executing a process for a fatal error determined in advance when the motor error is generated and the predetermined process conditions are not satisfied.

In the error processing method of the printing apparatus according to an aspect of the invention, it is possible to execute a process for a simple error or a process for a fatal error with respect to a generated motor error. In addition, when the process for a simple error with respect to the generated motor error is executed, the user may perform, for example, confirmation of the apparatus state, a necessary operation, or the like before the process for a simple error is executed using the instruction operation. Further, when the simple error process with respect to the generated motor error is executed, it is possible to execute the process for a simple error in the same manner as the case where a simple error is generated by simply waiting to receive the instruction operation of the user. Accordingly, it is possible to execute a common process with the case where a simple error is generated while performing more appropriate handling with respect to a motor error, whereby it becomes possible to perform more appropriate handling with respect to errors. Here, the process for a fatal error is determined in advance as a process to be executed with respect to a fatal error and includes a process or the like for providing notification of the generation of the fatal error. Further, in the error processing method of the printing apparatus, various embodiments of the above-described printing apparatus may be adopted; moreover, various steps for realizing each function of the above-described printing apparatus may be added.

BRIEF DESCRIPTION OF THE DRAWINGS

The invention will be described with reference to the accompanying drawings, wherein like numbers reference like elements.

FIG. 5 is an explanatory diagram describing an example of setting contents of a paper supply and discharge printing request.

DESCRIPTION OF EXEMPLARY EMBODIMENTS

Figure 1:
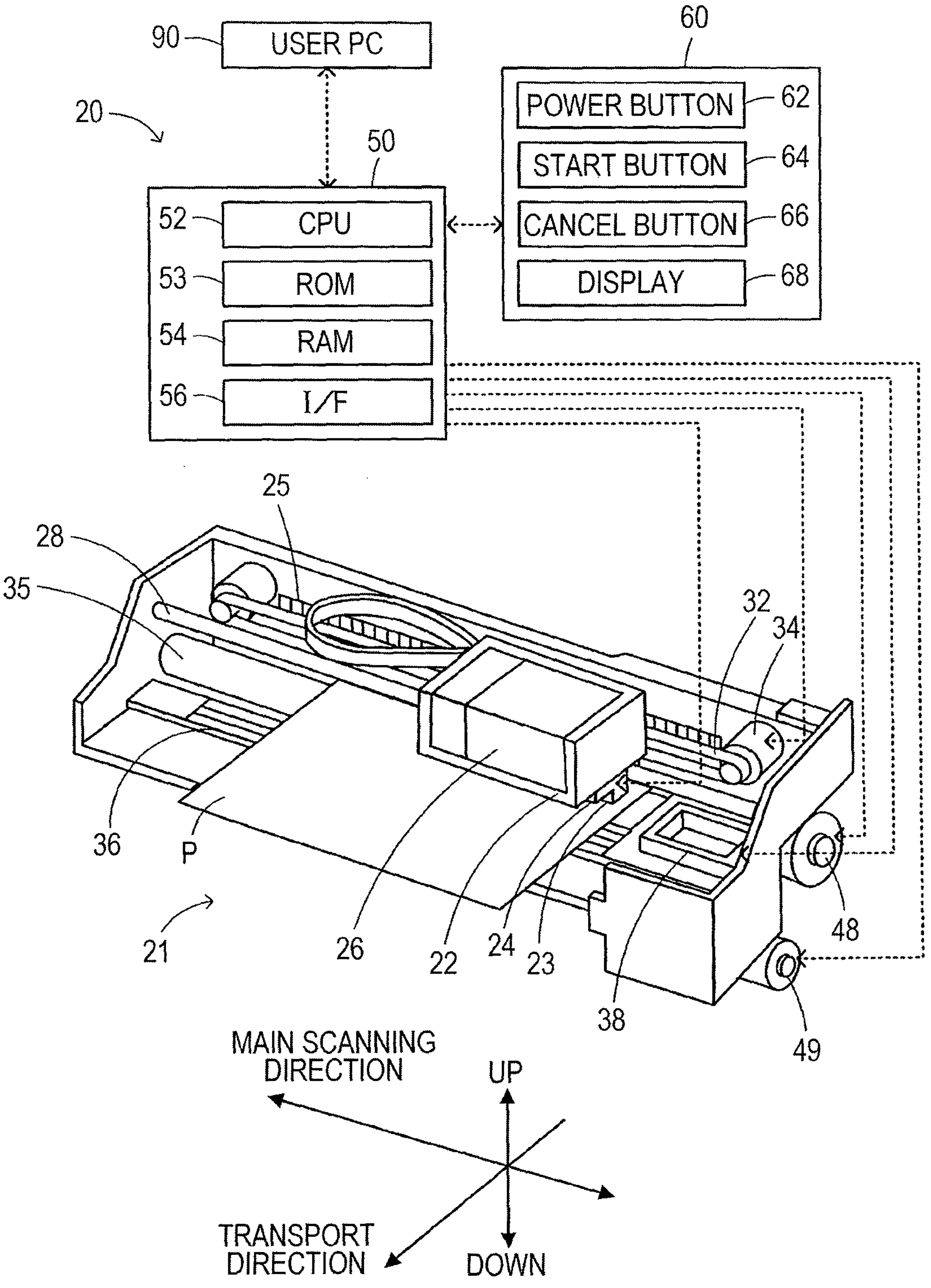
FIG. 1 is a configuration diagram schematically showing the configuration of an ink jet printer.
Figure 2:
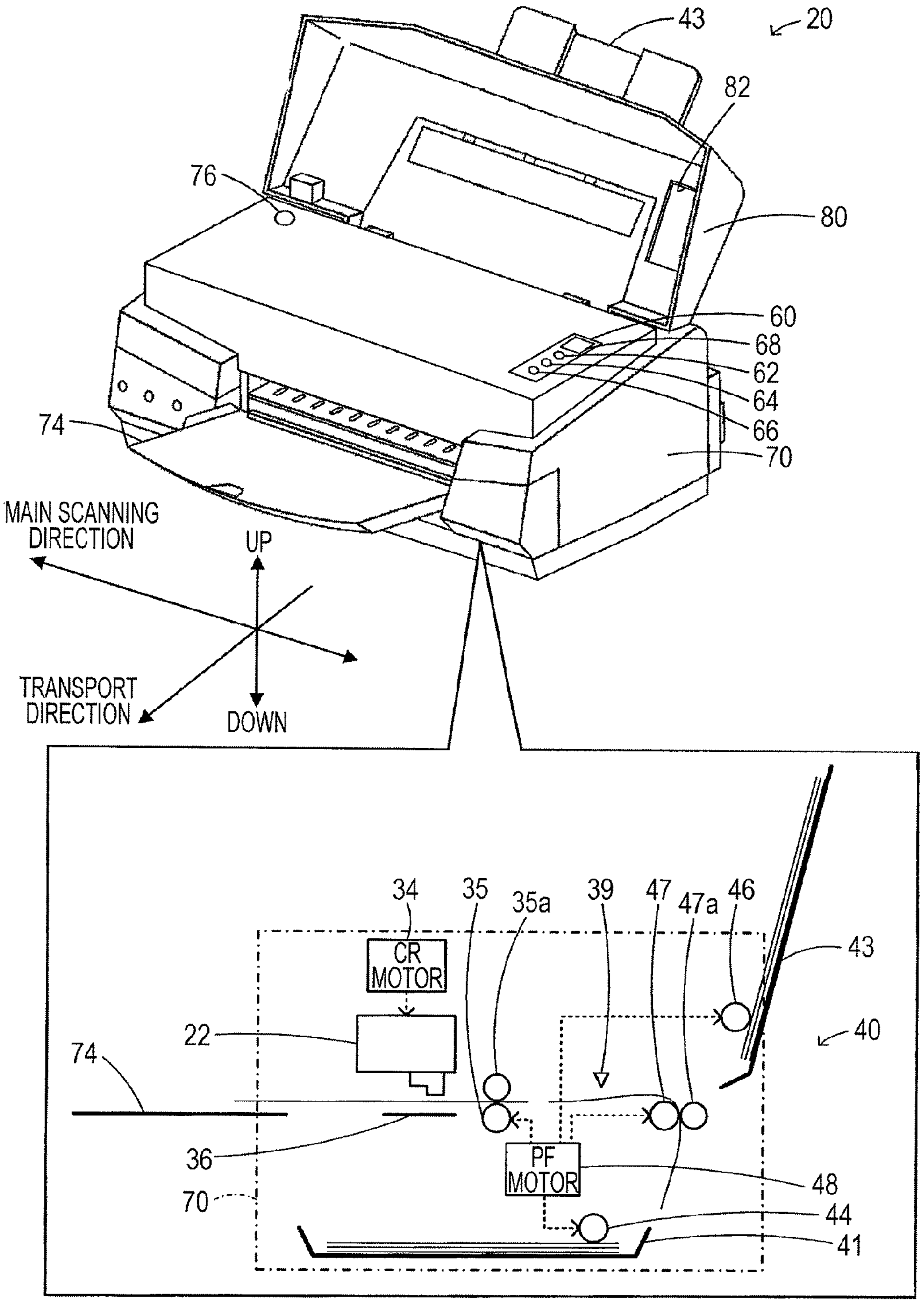
FIG. 2 is an explanatory diagram showing the configuration of the external appearance of the ink jet printer and a transport mechanism.

Next, embodiments of the invention will be described based on the drawings. FIG. 1 is a configuration diagram schematically showing the configuration of an ink jet printer 20 that is an embodiment of the invention. FIG. 2 is an explanatory diagram showing the external appearance of the ink jet printer 20 and an outline of the configuration centering on a transport mechanism 40 transporting printing paper. As shown in FIG. 1, the ink jet printer 20 of the present embodiment is provided with a printer mechanism 21 performing a printing process of ejecting ink droplets from a nozzle 23 of a print head 24 provided at the lower part of a carriage 22 with respect to paper P transported on a platen 36, a capping apparatus 38 performing capping to seal a nozzle forming surface in which a nozzle 23 of the print head 24 arranged in the vicinity of the right edge of the platen 36 is formed and performing cleaning by suctioning ink of inside the nozzle 23 as necessary, a transport mechanism 40 feeding one sheet of printing paper of various types and performing transport to the printer mechanism 21 as the paper P, a controller 50 controlling the entirety of the apparatus, and an operation panel 60 in which a plurality of operation buttons such as a power button 62 turning the power on and off for the entire apparatus according to an operation of the user, a start button 64 instructing the start of various types of process such as the printing process, and a cancel button 66 instructing the cancellation of various types of process, as well as a display 68 are arranged. As shown in FIG. 2, the printer mechanism 21, capping apparatus 38, the main part of the transport mechanism 40, and the controller 50 are accommodated in the housing 70. The operation panel 60 is arranged on the right side of the upper surface of the housing 70 with respect to the opening portion 82 so that the user may perform operation from the opening portion 82 even in a state where the cover 80 (FIG. 2 shows an open state) which covers the housing 70 is closed.

As shown in FIG. 1, the printer mechanism 21 includes: a paper feeding roller 35 driven by the transport motor 48 and transporting paper P on a platen 36 from the back to the front in the drawing; a carriage 22 reciprocating in the left and right direction (main scanning direction) which is the width direction of the paper P along the guide 28 installed at the carriage belt 32; a carriage motor 34 driving the carriage 22 (below, referred to as a CR motor); a replaceable ink cartridge 26 mounted on the carriage 22 and storing ink of a plurality of colors; and a print head 24 in which a plurality of nozzles 23 ejecting ink droplets by applying pressure to the ink supplied from the ink cartridge 26 are formed. The print head 24 may adopt a configuration of applying voltage to a piezoelectric element to thereby deform the piezoelectric element and apply pressure to the ink, or may adopt another configuration of applying voltage to a heat element (for example, a heater or the like) to thereby heat the ink and apply pressure to the ink using the generated bubbles.

The capping apparatus 38 is used to perform cleaning in a state where the print head 24 is moved to a position (below, referred to as the home position) on the capping apparatus 38 in a portion outside the paper P in the width direction and to suppress thickening (drying) of the ink inside the nozzle 23 when performing capping of the print head 24 while printing is paused. The capping apparatus 38 operates to cover the nozzle forming surface of the print head 24 according to a control signal from the controller 50 when the print head 24 moves to the home position along with the carriage 22, and, as necessary, may be set so as to be able to suction and discharge clogged ink in the nozzle 23 by applying negative pressure of the suction pump (not shown) to the nozzle forming surface of the print head 24. In addition, the suctioned and discharged waste ink is stored in a waste liquid tank (not shown).

As shown in FIG. 2, the transport mechanism 40 includes: a paper feeding cassette 41 arranged on the bottom of the housing 70; a back tray 43 allowing the feeding of paper from the back surface of the printer mechanism 21; feeding rollers 44 and 46 respectively performing paper feeding from the paper feeding cassette 41 and the back tray 43; a paper feeding roller 47 transporting printing paper fed from any of the feeding rollers 44 and 46 toward the paper feeding roller 35 of the printer mechanism 21; and a transport motor (below, referred to as a PF motor) 48 capable of driving one or more arbitrary rollers among the paper feeding roller 35 and the feeding rollers 44, 46, and 47 through a gear mechanism (not shown). By controlling the PF motor 48 according to a signal from the controller 50, the transport mechanism 40 is able to transport one sheet of printing paper accommodated in one selected from either the feeding cassette 41 or the back tray 43 to the printer mechanism 21 as the paper P through a transport path (not shown). When the printing process to the paper P by the printer mechanism 21 is finished, the paper P is discharged into the discharge tray 74. Although not shown in FIG. 1, driven rollers 35*a* and 47*a* are arranged to respectively form pairs with the paper feeding roller 35 and the feeding roller 47. In addition, a paper detection sensor 39 detecting the presence or absence of printing paper, such as a reflective type photo-sensor, is arranged on the transport path to the paper feeding roller 35 of the printer mechanism 21 from the feeding roller 47 of the transport mechanism 40.

The controller 50 is configured as a microprocessor based around a CPU 52, and includes: a ROM 53 storing various types of control programs and various types of data; a RAM 54 temporarily storing data, an interface (I/F) 56 exchanging information with external apparatuses; and an input output port (not shown). In the RAM 54, a print buffer region is provided, and print data sent through the I/F 56 from the user PC 90 to the print buffer region are stored. In the controller 50, a position detection signal from a linear type encoder 25 detecting the position of the carriage 22, a paper detection signal from the paper detection sensor 39, an on off signal from the power button 62, an operation signal from the start button 64, an operation signal from the cancel button 66, an open or closed state detection signal from an open or closed state detection sensor 76 (refer to FIG. 2) detecting whether a cover 80 installed in the housing 70 is open or closed, and the like are input through the input port, in addition to which, a print job from the user PC 90 or the like is input through the I/F 56. In addition, from the controller 50, a driving signal to the print head 24, a control signal to the capping apparatus 38, a control signal to the CR motor 34 and PF motor 48, a display signal to the display 68, and the like are output through the output port, in addition to which, print status information or the like is output to the user PC 90 through the I/F 56.

In the ink jet printer 20 configured in this manner, when a print set, print data, and a print command are input from the user PC 90 through the I/F 56, the print control described below is performed by the controller 50. In the print control, the CPU 52 of the controller 50 first performs the feeding process controlling the PF motor 38 so as to feed one sheet of printing paper specified by the print set to the top of the platen 36, controls the CR motor 34 so that the carriage 22 moves in the main scanning direction, and also performs a single pass printing process driving the print head 24 so that ink is ejected according to the print data. Subsequently, as long as there are print data for the next pass, the single pass printing process is repeated. When there are no print data for the next pass, a discharge process is performed in which the CR motor 34 is controlled so that the carriage 22 moves to the home position and the PF motor 48 is controlled so that the paper P is discharged to the discharge tray 74 by the rotation of the paper feeding roller 35, whereby the control of one sheet of paper for printing is finished. Here, when there are print data for the next page continuing from the present page, the next page feeding process is performed following the discharge process of the present page, and, along with this, the printing process and the discharge process are executed, whereby control of the next single sheet of the paper for printing is finished. The print control repeats the control in a similar manner until there are no longer any print data for subsequent pages.

Figure 3:
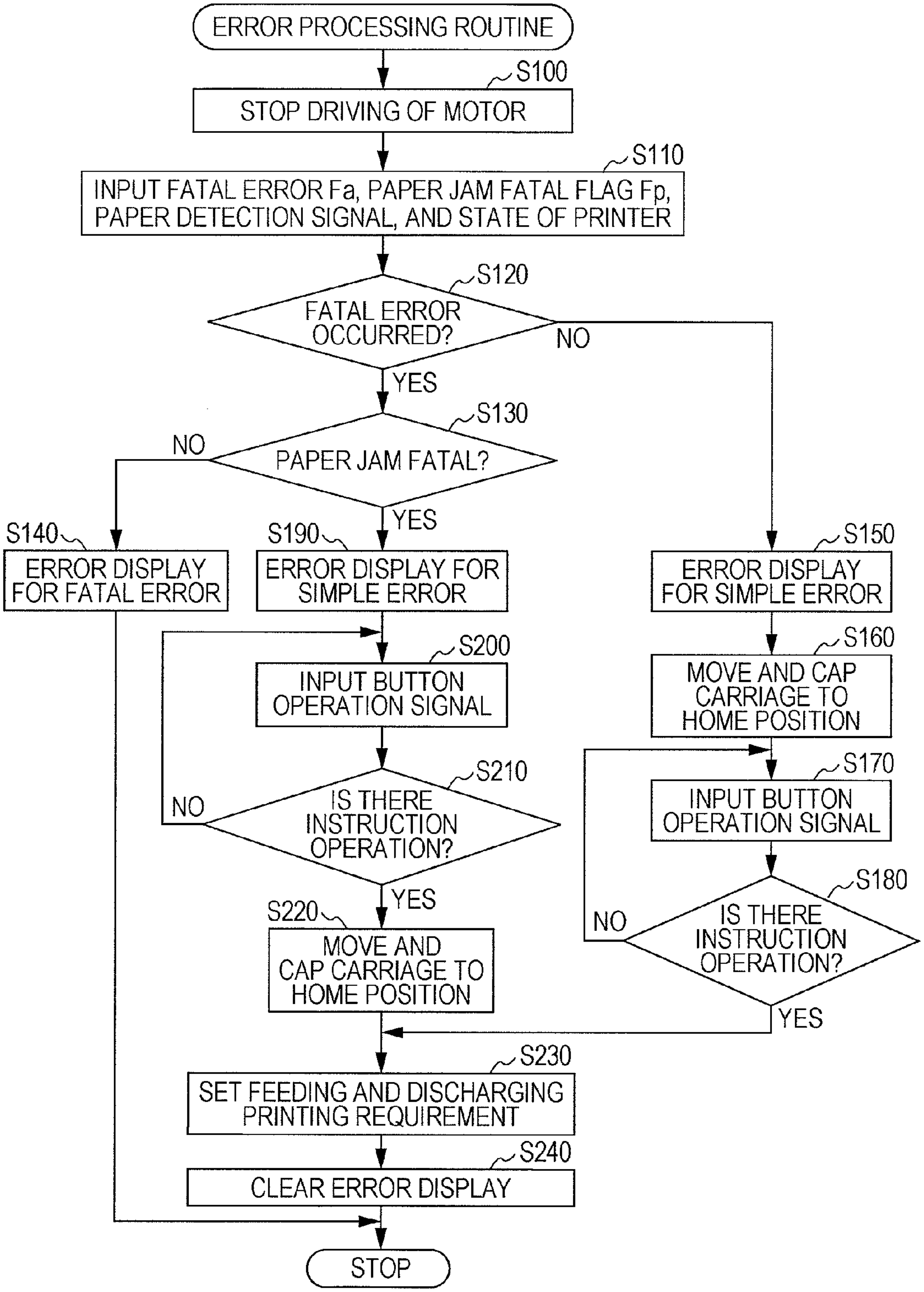
FIG. 3 is a flowchart showing an example of an error processing routine.

Next, description will be given of an operation of the ink jet printer 20 configured in this manner, in particular, an operation when an error has occurred. FIG. 3 is a flowchart showing an example of an error processing routine executed by the CPU 52 of the controller 50. The routine is stored in the ROM 53 and executed by the CPU 52 when the occurrence of an error is detected by an error detection routine (not shown) during the execution of the print control. In the embodiments, as the types of error, two types of error are prepared including a fatal error for which power restoration (an operation of turning the power off and then on again) is necessary for error resolution and a simple error for which power restoration is not necessary for error resolution, and details thereof will be described below.

When the error processing routine is executed, the CPU 52 of the controller 50 first interrupts the print control by stopping the driving of the CR motor 34 or the PF motor 38 or the like (step S100), and then executes a process in which necessary data for the error process are input, such as a fatal flag Fa in which an initial value of 0 is set and in which a value of 1 is set when a fatal error is generated, a paper jam fatal flag Fp in which an initial value of 0 is set and in which a value of 1 is set when a fatal error is generated and determined to be a paper jam error in which printing paper is clogged inside the apparatus, a paper detection signal as an on off signal from the paper detection sensor 39, and the state of the ink jet printer 20 (step S110). In the embodiments, the state of the ink jet printer 20 is input as the operation state of the ink jet printer 20 expressing the states such as executing a printing process (during printing), executing a feeding process (during feeding), executing a discharge process (during discharging) and, other than these, being on standby. Here, description will be given of the fatal errors and the simple errors.

Figure 4:
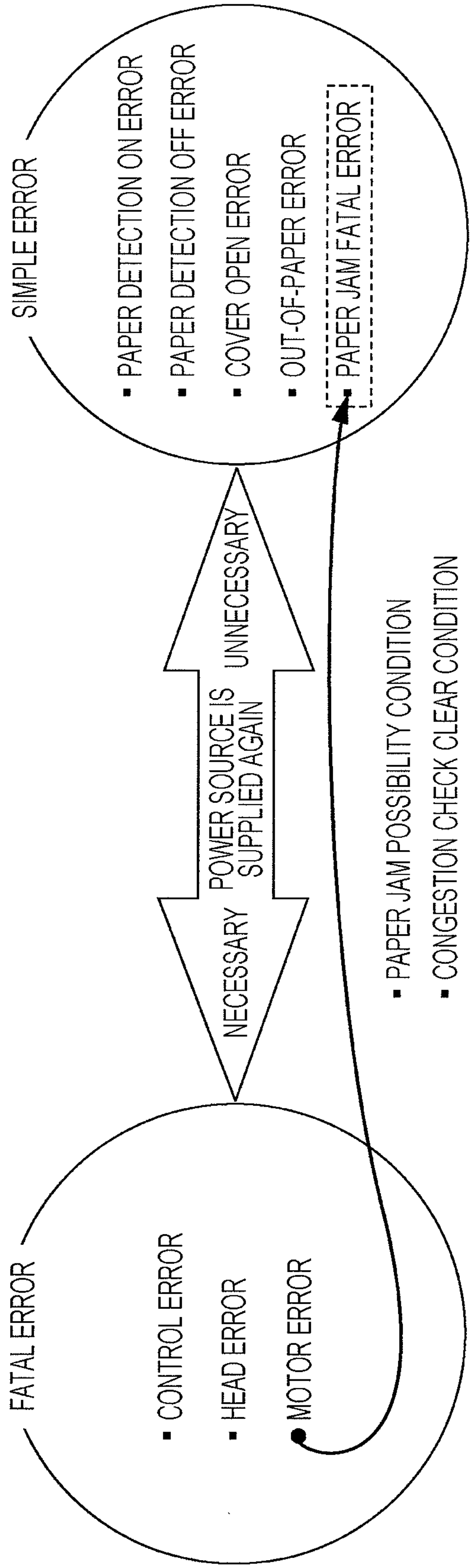
FIG. 4 is an explanatory diagram showing an example of a fatal error and a simple error.

FIG. 4 is an explanatory diagram showing an example of a simple error and a fatal error. As fatal errors, for example, there are controller errors detected when there is a possibility that the controller 50 may not work normally based on the respective states of the CPU 52, ROM 53, RAM 54, and I/F 56, head errors detected when there is a possibility that the print head 24 may not be driven normally according to the driving signal, motor errors detected when there is a possibility that one of the CR motor 34 and the PF motor 38 may not work normally according to the control signal during the execution of the print control, and the like. As simple errors, there are paper detection on errors (or paper detection off errors) in which an on signal (or an off signal) from the paper detection sensor 39 is input for more than a predetermined time, cover open errors in which an open or closed state detection signal from the open or closed state detection sensor 76 indicating an open state is input for more than a predetermined time, out-of-paper errors detected when an off signal is input from a paper detection sensor (not shown) indicating a state where there is no printing paper in the feeding cassette 41 or the back tray 43 specified by the print set when the print control is executed, and the like. Further, when a motor error is detected and both conditions of a paper jam possibility condition determined in advance and a motor out-of-control check clear condition are satisfied, a fatal error for which power restoration is necessary is generated; however, if the user deals with the cause of the paper jam by confirming the state of the apparatus, removing the paper, or the like, and it is determined that print control may be resumed without restoring the power, that is, it is determined that a paper jam fatal error is generated and nothing more, this is processed as a simple error. The paper jam possibility condition may use, for example, a condition based on the operation state of the ink jet printer 20 indicating states such as printing, feeding, discharging, and standby and on a paper detection signal from the paper detection sensor 39. Further, the out-of-control check clear condition may, for example, use a condition satisfied when confirmation is made of a slight amount of driving according to instructions in the opposite direction to the direction in which each motor of the CR motor 34 and the PF motor 38 was driving before interruption of the print control. Therefore, when the generation of one of these fatal errors is detected, a value of 1 is set for the fatal flag Fa; however, when it is determined that the generated fatal error is a paper jam fatal error, a value of 1 is also set for the paper jam fatal flag Fp. In addition, when the generation of a fatal error and the generation of a simple error are detected simultaneously, the processing of the fatal error is prioritized.

When data are entered in this manner, the input fatal flag Fa and the paper jam fatal flag Fp are investigated (step S120 and step S130). When the fatal flag Fa has a value of 1 and the paper jam fatal flag Fp has a value of 0, it is determined that a fatal error which is not a paper jam fatal error has been generated and error display for the fatal error is performed on the display 68 (step S140), whereby the error processing routine is finished. As the error display for fatal errors, it is possible to perform display to the effect that a fatal error has been generated (as well as the type of error) and to the effect that power restoration is necessary by displaying writing, displaying a code, or a combination of both of these. Here, when power restoration is performed by the operation of the power button 62 by the user, an initialization process determined in advance is performed at the time of system startup and a state where printing is possible is achieved or, in some cases, it is again detected that a fatal error has occurred.

When the fatal flag Fa has a value of 0, it is determined that a simple error has been generated and error display for a simple error is performed on the display 68 (step S150), then the CR motor 34 is controlled so that the carriage 22 is moved to the home position and the capping apparatus 38 is controlled so that capping of the print head 24 is performed (step S160). Here, as the error display for a simple error, it is possible to perform display to the effect that a simple error has been generated (as well as the type of error) by displaying writing, displaying a code, or a combination of both of these. Further, by moving the carriage 22 to the home position, it is possible to more easily perform the next operation such as supplying and discharging paper, reprinting, and the like, for example. In addition, by performing capping of the print head 24, it is possible to protect the print head 24 from drying or the like.

Subsequently, waiting is performed until an operation signal acting as an on signal is input by the button operation of the operation panel 60 by the user (step S170 and step S180). When the on signal from the start button 64 or the on signal from the cancel button 66 is input, it is determined that an instruction operation from the user has been received and a supply and discharge paper print request (target operation to be executed next) requesting the next operation of the ink jet printer 20 is set (step S230) based on the previously input operation state of the ink jet printer 20, the paper detection signal from the paper detection sensor 39, and the operation signal being currently input. Here, in the setting of the supply and discharge paper print request, the relationship of the operation state of the ink jet printer 20 and the paper detection signal at the time of the error generation, the type of operation signal (start button 64 and cancel button 66) and the supply and discharge paper print request is determined in advance and stored in the ROM 53 as a table for setting a supply and discharge paper print request, and, when the operation state of the ink jet printer 20, the paper detection signal, and the type of operation signal are received, a corresponding supply and discharge paper print request is derived from the stored table. FIG. 5 shows an example of setting contents of a supply and discharge paper print request. As illustrated, in the embodiment, when the start button 64 is operated, requests of a plurality of patterns are set according to the operation state of the ink jet printer 20 at the time of error generation and whether the paper detection signal is on or off, and, when the cancel button 66 is operated, a discharge request is set regardless of the state when the error was generated. When the discharge request is set, the discharge process is executed after this routine has finished and the print control interrupted due to the generation of the error is not restarted. When the start button 64 is operated, in a case where the paper detection signal is on during feeding at the time of error generation, a request is set so as to execute a feeding process and printing process of the current page which was being processed when the print control was interrupted after the execution of the discharge process, in a case where the paper detection signal is on during printing at the time of error generation, a request is set so as to execute a feeding process and printing process of the subsequent page to the current page which was being processed when the print control was interrupted after the execution of the discharge process, and in a case where the paper detection signal is on during discharging at the time of error generation, a request is set so as to execute a feeding process and printing process of the subsequent page to the current page which was being processed when the print control was interrupted after the execution of the discharge process. Further, when the start button 64 is operated, in a case where the paper detection signal during feeding at the time of error generation is off, since there is no need for discharging, a request is set so as to execute the feeding process and printing process of the current page. Further, a case where the paper detection signal is off during the printing or paper discharging when the error is generated is not assumed in the ink jet printer 20 of the embodiments. Therefore, when the start button 64 is operated, print control is resumed (restarted) according to the request after the routine has finished.

When this kind of supply and discharge paper print request is set, the error display for a simple error is cleared (step S240) and the error processing routine is finished. When the error processing routine is finished, the discharge process is executed or the print control is resumed according to the set supply and discharge paper print request; however, even when the print control is resumed, in a case where the cover 80 is not closed or a case where the printing paper is not replenished, the generation of a simple error will be detected again.

When the fatal error flag Fa has a value of 1 in step S120 and step S130 and the paper jam fatal error Fp has a value of 1, since the generated fatal error is a paper jam fatal error, it is determined that it may be processed as a simple error and error display for a simple error is performed (step S190), waiting is performed for the input of an operation signal acting as an on signal according to the button operation of the operation panel 60 by the user (step S170 and step S180), subsequently, the carriage 22 is moved to the home position and the capping of the print head 24 is performed (step S190), the supply and discharge paper print request is set and the error display is performed (step S230 and step S240), and the error processing routine is finished. When the error processing routine is finished, the discharging process is executed and the print control is resumed according to the set supply and discharge paper print request; however, in the ink jet printer 20 of the embodiment, when a process for a simple error in which the carriage 22 is moved to the home position in response to this paper jam fatal error is executed, unlike a case where only a simple error is generated, waiting is performed to receive a button operation by the user and the carriage 22 is moved from the stopped position at the time of the error generation. Therefore, before moving the carriage 22, the user may, for example, remove the paper that is the cause of the paper jam, reset the paper to the correct position, or the like, and it is possible to ensure enough time to deal with the cause of the paper jam. In this manner, when a process for a simple error is executed with respect to a paper jam fatal error which is a motor error accompanying the satisfying of both the conditions of the paper jam possibility condition and the out-of-control check clear condition, the user may avoid the inconvenience (such as the need to redo print instructions or the need to wait for the restart) which comes from having to restore the power at the time of fatal error generation. In addition, when a process for a simple error is executed with respect to a paper jam fatal error, it is possible to execute a series of processes such as setting the next operation based on the printer operation state at the time of movement of the carriage 22, capping of the print head 24, or error generation, the on or off of the paper detection signal, and the type of button operation, as a common process with the case where a simple error is generated by simply waiting to receive the instruction operation of the user. In this manner, when a process for a simple error is executed with respect to a paper jam fatal error, it is possible perform processing simply without complicating the error process. Here, when a process for a simple error is executed with respect to a paper jam fatal error, in a case where it is not possible to correctly execute the discharge process or the print control and the cause of the paper jam remains when the paper discharge process is started or when the print control is restarted without the user dealing with the paper jam, only the generation of a fatal error is detected without detecting again the generation of a paper jam fatal error.

Here, the corresponding relationship between the constituent elements of the embodiment and the constituent elements according to an aspect of the invention will be made clear. The CR motor 34 of the embodiment corresponds to the "driving motor" according to an aspect of the invention, the start button 64 and the cancel button 66 correspond to the "operation receiving unit", and the controller 50, which receives a button operation of a user after the movement of the carriage 22 and sets a supply and discharge paper print request when a simple error is generated, moves the carriage 22 after receiving a button operation of a user and sets a supply and discharge paper print request when a process for a simple error is executed with respect to a paper jam fatal error, and executes the error processing routine of FIG. 3 performing error display for a fatal error with respect to a fatal error, corresponds to an "error processing execution unit". In addition, in this embodiment, an example of an error processing method of a printing apparatus according to an aspect of the invention will also be made clear by description of the operation of the printing apparatus.

According to the ink jet printer 20 of the above-described embodiment, when a simple error for which powering off is unnecessary is generated in the error resolution, a movement process or the like of the carriage 22 determined in advance is executed without waiting to receive the button operation of the user, when both conditions of a paper jam possibility condition and an out-of-control check clear condition are satisfied in a case where a motor error, in which the CR motor 34 or the like stops working correctly during the execution of the print control, is generated, a process for a simple error such as movement process or the like of the carriage 22 is executed after waiting to receive the button operation of the user, and, when neither of the two conditions are satisfied in a case where a motor error is generated, an error display process for a fatal error is performed. In this manner, it is possible to perform the process for a simple error or the process for a fatal error with respect to the generated motor error. In addition, when a process for a simple error such as a movement process of the carriage 22 is executed with respect to the generated motor error, it is possible for the user to remove the paper that is the cause of the paper jam or the like before executing the movement process of the carriage 22 or the like according to a button operation, for example. Further, when a process for a simple error is executed with respect to the generated motor error, simply by waiting to receive the button operation of the user, it is possible to execute a process for a simple error similarly to a case where a simple error is generated. Accordingly, it is possible to execute a common process with the case where a simple error is generated while performing more appropriate handling with respect to a motor error, whereby it becomes possible to perform more appropriate handling with respect to errors.

Here, the invention is not limited to the above-described embodiments and, needless to say, may be implemented in various embodiments within the technical scope according to an aspect of the invention.

In the embodiment described above, the setting of the supply and discharge paper print request is performed based on the printer state and the on or off of the paper detection signal during the error generation; however, the same request may be set regardless of the printer state during error generation, the same request may be set regardless of the on or off of the paper detection signal during the error generation, or the same request may be set regardless of the type of operation signal such as the start button 64 or the cancel button 66.

In the embodiment described above, the capping of the print head 24 is performed along with the movement of the carriage 22 to the home position when a simple error is generated or when a process for a simple error is executed with respect to a paper jam fatal error; however, the capping of the print head 24 need not be performed.

In the embodiment described above, if it is determined that a paper jam fatal error is generated when a motor error, which is one kind of fatal error, is detected and, along with this, both conditions of a paper jam possibility condition and an out-of-control check clear condition are satisfied, a process for a simple error such as a movement process of the carriage 22 is executed with respect to the paper jam fatal error; however, for example, when it is determined that the cause of the generated fatal error is some kind of motor overheating, a process for a simple error may be executed with respect to the error caused by the overheating. In such a case, setting may be made so as to wait to receive a button operation of a user and, along with this, to wait for a predetermined time necessary for the overheating to subside to pass and then permit the driving of each motor.

In the embodiment described above, the transport mechanism 40 is provided with a feeding cassette 41 and a back tray 43; however, two or more feeding cassettes, or none, may be provided and it does not matter if the back tray is not provided.

In the embodiment described above, the carriage 22 on which the print head 24 is mounted and which is driven by the CR motor 34 reciprocates in the left and right direction (main scanning direction) which is the width direction of the paper P; however, a carriage moving in any direction within the region of the paper P, such as moving in the transport direction of the paper P, may be provided.

In the embodiment described above, description was given of applying the invention to the ink jet printer 20; however, as long as the printing apparatus is capable of processing a fatal error for which powering off is necessary during error resolution and a simple error for which powering off is not necessary, the invention may be applied to any type of printer, and the invention may be applied to an apparatus in which the printing apparatus is integrated with a facsimile machine, scanner apparatus, or the like.

What is claimed is:

1. A printing apparatus capable of processing a fatal error for which powering off is necessary for error resolution and a simple error for which powering off is not necessary for error resolution, comprising:

a driving motor used in a printing process;

an operation receiving unit that receives an instruction operation of a user; and an error process execution unit that executes a process for predetermined errors, wherein, when the simple error is generated, the error process execution unit executes a process for a simple error determined in advance without waiting to receive the instruction operation of the user using the operation receiving unit, wherein, when a motor error in which the driving motor no longer runs normally is generated during the execution of the printing process and predetermined process conditions setting the process for the simple error to be executable are satisfied with respect to the motor error, the error process execution unit executes the process for the simple error after waiting to receive the instruction operation of the user using the operation receiving unit, and wherein, when the motor error is generated and the predetermined process conditions are not satisfied, the error process execution unit executes a process for a fatal error determined in advance;

wherein the driving motor is mounted with an ejection head ejecting ink, moves inside the region of the paper and moves a carriage that moves to a home position which may cap the ejection head outside the region of the paper, and wherein the error process execution unit executes a process of moving the carriage to the home position using the driving motor as the process for a simple error without waiting to receive the instruction operation of the user using the operation receiving unit when a simple error is generated, and stops the movement of the carriage by the driving motor, waits to receive the instruction operation of the user using the operation receiving unit, and executes the process for a simple error when predetermined processing conditions are satisfied including a condition that it is possible to determine if there is a possibility that paper clogging, in which the paper becomes clogged during paper supply or discharge or during printing according to the printing process when the motor error is generated, is generated.

2. The printing apparatus according to claim 1, wherein the error processing execution unit is a unit that executes a process of moving the carriage to the home position using the driving motor and capping the ejection head as the process for a simple error.

3. The printing apparatus according to claim 1, wherein when a simple error is generated, the error process execution unit receives an instruction operation of a user using the operation receiving unit after executing the process for a simple error, and the printing apparatus sets the target operation to be executed next based on the received instruction operation of the user and on the operation state of the printing apparatus including whether the printing apparatus at the time the simple error is generated is printing, feeding paper, or discharging paper, and wherein when the motor error is generated and the predetermined processing conditions are satisfied, the error process execution unit receives the instruction operation of the user using the operation receiving unit before executing the process for a simple error and sets the target operation of the printing apparatus based on the received instruction operation of the user and on the operation state of the printing apparatus at the time the motor error is generated.

4. An error processing method of a printing apparatus provided with a driving motor used in a printing process and an operation receiving unit that receives an instruction operation of a user and capable of processing a fatal error for which powering off is necessary for error resolution and a simple error for which powering off is not necessary for error resolution, the error processing method comprising:

executing a process for a simple error determined in advance without waiting to receive the instruction operation of the user using the operation receiving unit when the simple error is generated;

executing the process for the simple error after waiting to receive the instruction operation of the user using the operation receiving unit when a motor error in which the driving motor no longer runs normally is generated during the execution of the printing process and predetermined process conditions setting the process for the simple error to be executable are satisfied with respect to the motor error; and executing a process for a fatal error determined in advance when the motor error is generated and the predetermined process conditions are not satisfied;

wherein the driving motor is mounted with an ejection head ejecting ink, moves inside a region of a paper and moves a carriage that moves to a home position which may cap the ejection head outside the region of the paper, and wherein an error process execution unit executes a process of moving the carriage to the home position using the driving motor as the process for a simple error without waiting to receive the instruction operation of the user using the operation receiving unit when a simple error is generated, and stops the movement of the carriage by the driving motor, waits to receive the instruction operation of the user using the operation receiving unit, and executes the process for a simple error when predetermined processing conditions are satisfied including a condition that it is possible to determine if there is a possibility that paper clogging, in which the paper becomes clogged during paper supply or discharge or during printing according to the printing process when the motor error is generated, is generated.

* * * * *